J. L. Beers,
Water-Wheel Gate.
Nº 79,804. Patented July 14, 1868.
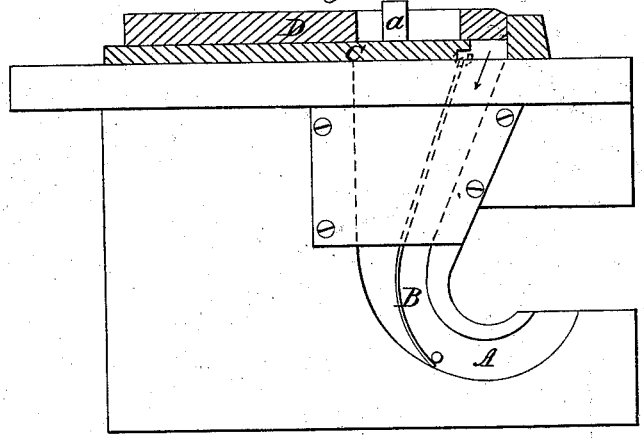
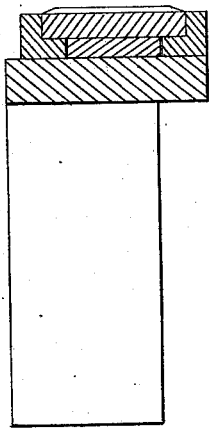
Witnesses:
A. A. Yeatman
A. N. Marr
Inventor:
J. L. Beers
per
Alexander Mason
attys

United States Patent Office.

JOHN L. BEERS, OF McALISTERVILLE, PENNSYLVANIA.

Letters Patent No. 79,804, dated July 14, 1868.

IMPROVED SCROLL FOR WATER-WHEELS.

*The Schedule referred to in these Letters Patent and making part of the same.*

TO ALL WHOM IT MAY CONCERN:

Be it known that I, JOHN L. BEERS, of McAlisterville, in the county of Juniata, and in the State of Pennsylvania, have invented certain new and useful Improvements in Scrolls for Water-Wheels; and do hereby declare that the following is a full, clear, and exact description thereof, reference being had to the accompanying drawings, and to the letters of reference marked thereon.

In the annexed drawings, making part of this specification, A represents the throat of a scroll for conducting water to a horizontal water-wheel. This throat has placed in it a cast-iron tongue, B, of about the same curvature as the back part of the scroll. This tongue is made thick enough to stand the pressure of water upon it, and as wide as the throat is from side to side, so that by moving its outer end the throat may be diminished or increased in size.

The outer end of the tongue is hinged or hooked to a bar, C. D represents the gate.

Both the gate and the bar slide upon suitable ways made for them. The bar is provided with a pin, $a$, which plays through and in a slot made in the gate D. This gate and bar are for the purpose of opening and closing the mouth of the scroll, controlling and regulating the supply of water to the wheel, which is not here represented.

By means of the tongue B the throat is made larger or smaller, to accommodate the amount of water required. In shutting off the water, the gate D is first closed, which relieves the tongue B of pressure, so that the inner bar C may be closed.

Having thus fully described my invention, what I claim as new, and desire to secure by Letters Patent, is—

The arrangement of the gate D and bar C with the adjustable tongue B and the throat A, as and for the purpose specified.

In testimony that I claim the foregoing, I have hereunto set my hand, this 10th day of June, 1867.

JOHN L. BEERS.

Witnesses:
 JOHN T. CRISWELL,
 WILLIAM DUNN.